United States Patent
Arai (10) Patent No.: US 8,363,357 B2
(45) Date of Patent: Jan. 29, 2013

(54) DISK DRIVE FLEXURE

(75) Inventor: Hajime Arai, Aiko-gun (JP)

(73) Assignee: NHK Spring Co., Ltd., Yokohama-Shi (JP)

( * ) Notice: Subject to any disclaimer, the term of this patent is extended or adjusted under 35 U.S.C. 154(b) by 120 days.

(21) Appl. No.: 13/075,279

(22) Filed: Mar. 30, 2011

(65) Prior Publication Data

US 2011/0242704 A1    Oct. 6, 2011

(30) Foreign Application Priority Data

Mar. 31, 2010   (JP) .................................. 2010-083946

(51) Int. Cl.
*G11B 5/48* (2006.01)
(52) U.S. Cl. ................................................ 360/245.9
(58) Field of Classification Search ............... 360/245.9, 360/246, 264.2
See application file for complete search history.

(56) References Cited

U.S. PATENT DOCUMENTS

| | | | | |
|---|---|---|---|---|
| 6,038,102 A * | 3/2000 | Balakrishnan et al. | .... | 360/264.2 |
| 6,487,047 B1 * | 11/2002 | Balakrishnan | ............. | 360/245.8 |
| 6,714,385 B1 * | 3/2004 | Even et al. | .................... | 360/246 |
| 6,741,141 B2 * | 5/2004 | Kormanyos | ................. | 333/81 A |
| 7,352,535 B2 * | 4/2008 | Arya et al. | ................. | 360/245.9 |
| 7,465,884 B2 * | 12/2008 | Ooyabu et al. | ................ | 174/255 |
| 8,045,297 B2 * | 10/2011 | Contreras et al. | .......... | 360/245.9 |
| 8,189,297 B2 * | 5/2012 | Arai | .............................. | 360/246 |
| 8,194,354 B1 * | 6/2012 | Zhang et al. | ............... | 360/245.9 |

FOREIGN PATENT DOCUMENTS

JP     9-282624 A     10/1997

* cited by examiner

*Primary Examiner* — Angel A. Castro
(74) *Attorney, Agent, or Firm* — Holtz, Holtz, Goodman & Chick, P.C.

(57) ABSTRACT

A flexure is provided with a metal base of stainless steel, an insulating layer, and a pair of copper conductors. An opening region including an opening and a non-opening region without an opening are formed in a longitudinal part of the metal base. One of the conductors is provided with a first slit extending longitudinally relative to the conductor, first band-like portions on the opposite sides of the first slit, and a first junction connecting the first band-like portions. The other conductor is provided with a second slit extending longitudinally relative to the conductor, second band-like portions on the opposite sides of the second slit, and a second junction connecting the second band-like portions. These conductors are arranged covering both the opening and non-opening region of the metal base.

9 Claims, 9 Drawing Sheets

DISK DRIVE FLEXURE

CROSS-REFERENCE TO RELATED APPLICATIONS

This application is based upon and claims the benefit of priority from prior Japanese Patent Application No. 2010-083946, filed Mar. 31, 2010, the entire contents of which are incorporated herein by reference.

BACKGROUND OF THE INVENTION

1. Field of the Invention

This invention relates to a flexure used in a disk drive suspension for an information processing apparatus.

2. Description of the Related Art

A hard disk drive (HDD) is used in an information processing apparatus, such as a personal computer. The HDD comprises a magnetic disk rotatable about a spindle, a carriage turnable about a pivot, etc. A disk drive suspension is disposed on an arm of the carriage.

The disk drive suspension comprises a load beam and flexure superposed thereon. A magnetic head comprising a slider is mounted on a gimbal portion formed near the distal end of the flexure. The magnetic head is provided with elements (transducers) for accessing data, that is, for reading or writing. The suspension, flexure, etc., constitute a head gimbal assembly.

The flexure is practically used in various forms depending on the required specifications. By way of example, it is a flexure with conductors, which comprises a thin metal base of stainless steel, insulating layer of an electrically insulating material, such as polyimide, and a plurality of pairs of copper conductors. The insulating layer is formed on the metal base, and the conductors on the insulating layer. Respective one ends of the conductors are connected to elements (e.g., magnetoresistive elements) on the magnetic head. The other ends of the conductors are electrically connected to an electrical circuit, such as an amplifier. These conductors constitute a conductive circuit portion of the suspension. The impedance of the conductors needs to be reduced in order to reduce energy consumption of the amplifier. Further, a high-frequency band is needed in order to increase the number of signals transmitted per unit time.

An example of the flexure with conductors is disclosed in Jpn. Pat, Appln. KOKAI Publication No. 9-282624 (Patent Document 1). A plurality of openings are formed in a metal base of the flexure so as to be arranged at regular intervals along the conductors. Since these openings serve to reduce the eddy current loss of a conductive circuit portion, attenuation in a high-frequency band is reduced. Another example of the flexure with conductors is disclosed in U.S. Pat. No. 6,714,385 (Patent Document 2). A plurality of openings are formed in a load beam of a suspension that comprises the flexure so as to be arranged at regular intervals along the conductors.

Suspensions tend to become further smaller as disk drives are miniaturized and improved in recording density. Conductors should be made wider in order to reduce the impedance of a conductive circuit portion of a flexure. The smaller the suspension, therefore, the higher the ratio of the mass of the conductive circuit portion to that of the suspension is. Therefore, the dynamic characteristics of the suspension are easily affected by the conductive circuit portion. Thus, the conductive circuit portion is required to be made lighter.

If the conductors are made narrower, however, the impedance increases, thereby causing an increase in energy consumption. If the width of each conductor is simply reduced, moreover, the attenuation in the high-frequency band may become too high for high-speed data transmission, depending on the configuration of the conductive circuit portion. Although the openings are formed in the metal base in the conductive circuit portion of Patent Document 1 described above, the weight reduction ratio is low if the conductor weight is the same as in the conventional case. Even if the openings are formed in the load beam, as in Patent Document 2, the conductive circuit portion of the flexure cannot be made lighter.

BRIEF SUMMARY OF THE INVENTION

This invention provides a disk drive flexure light in weight and excellent in electrical properties.

A flexure of the invention comprises a plate-like metal base consisting mainly of an electrically conductive material and formed, in a longitudinal part thereof, with an opening region, which comprises an opening, and a non-opening region without an opening, an insulating layer consisting mainly of an electrically insulating material and formed on the metal base, and a pair of conductors arranged longitudinally relative to the metal base on the insulating layer and electrically connected to a magnetic head. At least one of the conductors comprises a slit extending longitudinally relative to the conductor, band-like portions extending along the slit on the opposite sides thereof, and a junction electrically connecting the band-like portions. The conductor which comprises the slit is located covering both the opening region and the non-opening region of the metal base. A plurality of the slits and junctions are formed at regular intervals longitudinally relative to the conductor. The band-like portions are continuous longitudinally relative to the conductor.

According to this arrangement, the flexure with a conductive circuit portion can be made lighter without degradation in electrical properties (e.g., frequency band). Thus, the ratio of the mass of the conductive circuit portion of the flexure to that of a suspension can be reduced. In other words, the influence of the conductive circuit portion of the flexure on the dynamic characteristics of the suspension can be reduced. If the suspension becomes lighter, for example, its impact resistance, as well as the seek performance and other dynamic characteristics, are improved.

In an aspect of the invention, a plurality of the slits may be formed transversely or longitudinally relative to the conductor. Further, each of the conductors may be formed with the slit, the band-like portions, and the junction. Furthermore, a weld portion configured to secure the metal base and the load beam to each other may be disposed within the slit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A disk drive flexure according to one embodiment of the present invention will now be described with reference to FIGS. 1 to 7.

Figure 1:
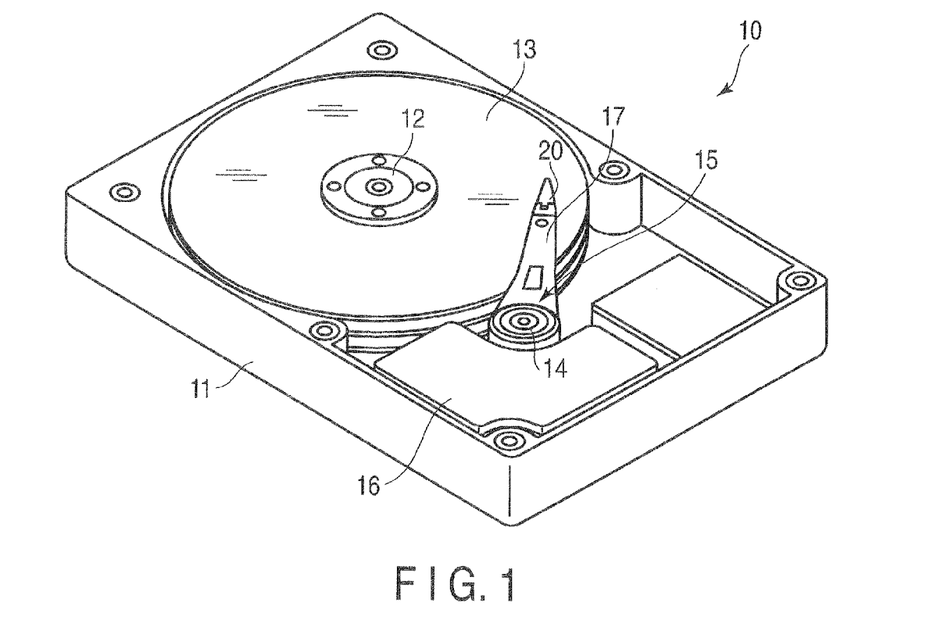
FIG. 1 is a perspective view showing an example of a disk drive with a suspension.

A hard disk drive (HDD) 10 shown in FIG. 1 comprises a case 11, disks 13 rotatable about a spindle 12, carriage 15 turnable about a pivot 14, positioning motor 16 for actuating the carriage 15, etc. The case 11 is covered by a lid (not shown).

Figure 2:
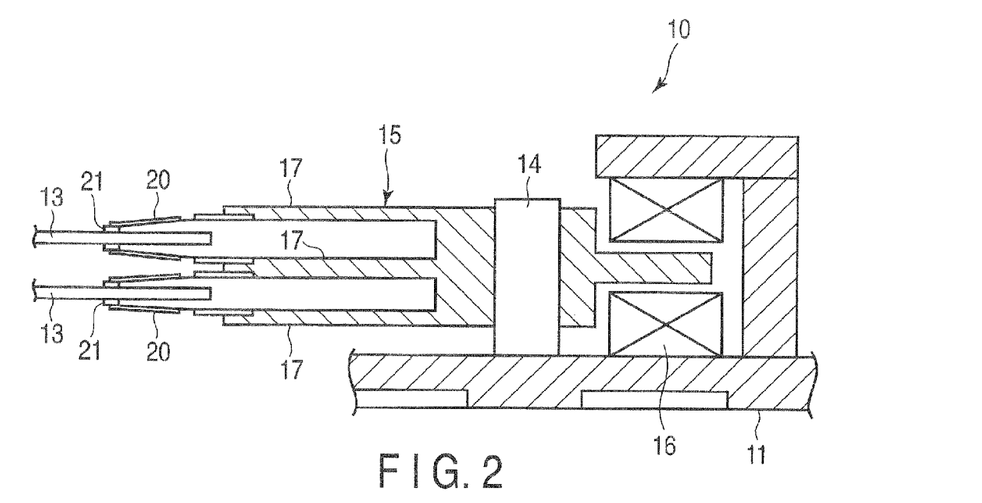
FIG. 2 is a sectional view of a part of the disk drive shown in FIG. 1.

FIG. 2 is a sectional view typically showing a part of the disk drive 10. As shown in FIG. 2, the carriage 15 comprises arms 17. A suspension 20 is mounted on the distal end portion of each arm 17. A slider, which constitutes a magnetic head 21, is disposed on the distal end of the suspension 20. If each disk 13 is rotated at high speed, an air bearing is formed between the disk 13 and the magnetic head (slider) 21.

If the carriage 15 is turned by the positioning motor 16, the suspension 20 moves radially relative to the disk 13. Thereupon, the magnetic head 21 moves to a desired track of the disk 13. Elements, such as magnetoresistive (MR) elements capable of conversion between magnetic and electrical signals, are disposed on the magnetic head 21. These elements serve to write to or read from the disk 13.

Figure 3:
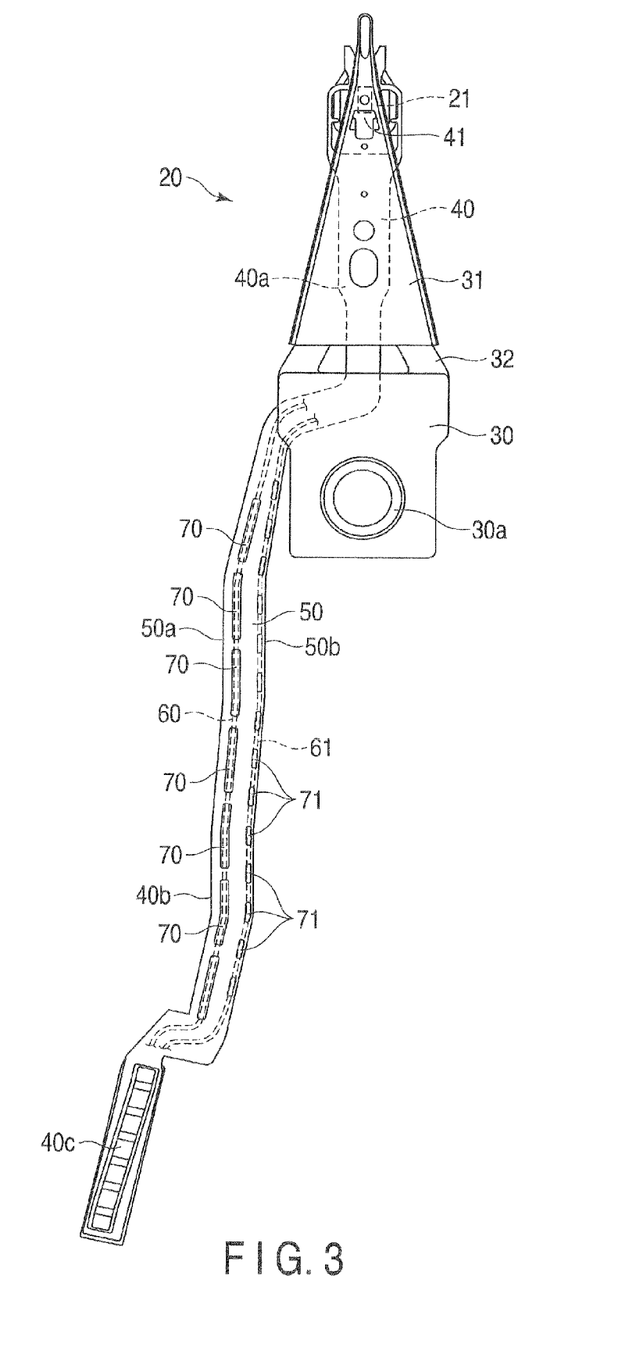
FIG. 3 is a plan view of a disk drive suspension comprising a flexure according to one embodiment of the invention.

FIG. 3 shows an example of the suspension 20. The suspension 20 comprises a baseplate 30, load beam 31, hinge members 32 formed of thin plate springs, and flexure 40 with conductors. The flexure 40 with conductors will hereinafter be referred to simply as the flexure 40. A boss portion 30a of the baseplate 30 is secured to its corresponding arm 17 (FIGS. 1 and 2) of the carriage 15.

As shown in FIG. 3, the flexure 40 is located along the load beam 31. A part 40a of the flexure 40 that overlaps the load beam 31 of the flexure 40 is secured to the load beam 31 by fixing means, such as laser welding. A tongue 41 that functions as a gimbal portion is formed near the distal end of the flexure 40. The magnetic head 21 is mounted on the tongue 41. A rear portion (tail portion) 40b of the flexure 40 extends behind the baseplate 30. A terminal area 40c of the flexure 40 is connected to an amplifier (not shown) for the disk drive 10.

Figure 4:
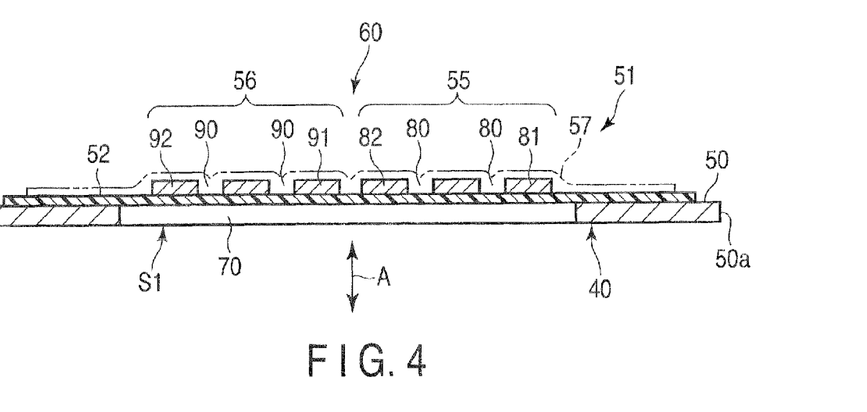
FIG. 4 is a cross-sectional view of a first portion of the flexure of the suspension shown in FIG. 3.
Figure 5:
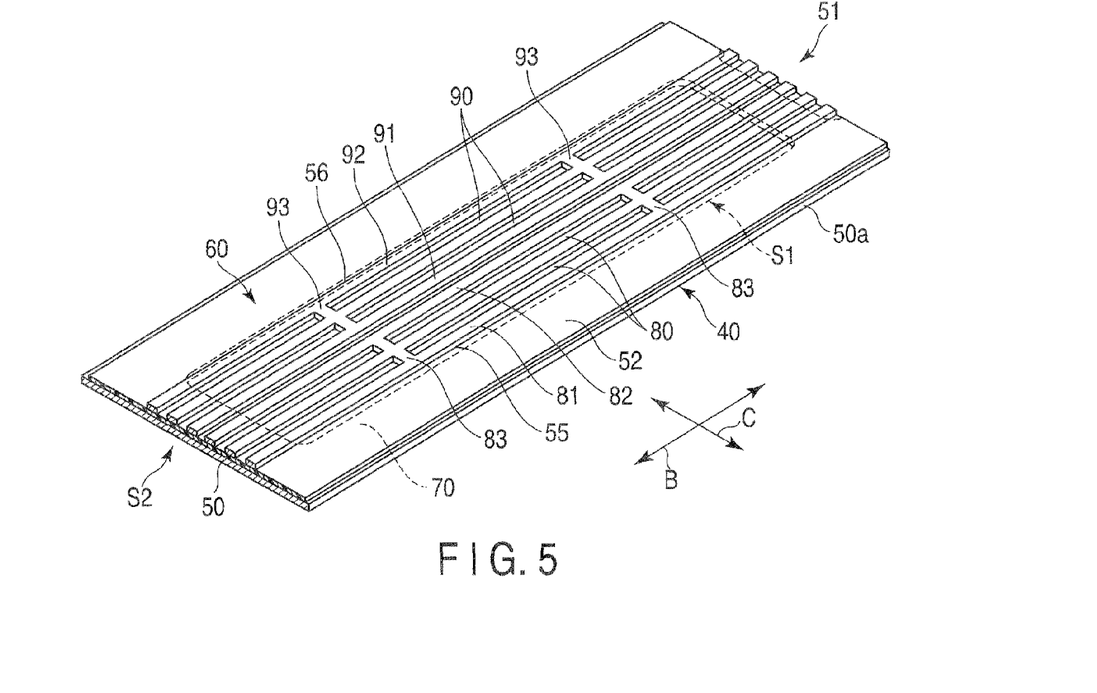
FIG. 5 is a perspective view of the first portion shown in FIG. 4.

FIG. 4 shows a cross-section of a longitudinal part (first portion) of the flexure 40. FIG. 5 is a perspective view of the first portion taken from one thicknesswise side of a metal base 50. The flexure 40 comprises the plate-like metal base 50 of an electrically conductive material and conductive circuit portion 51 formed along the metal base 50. An example of the conductive material of the metal base 50 is a thin, springy stainless-steel plate.

The conductive circuit portion 51 comprises an insulating layer 52 formed on the metal base 50, a pair of conductors 55 and 56 (first and second conductors 55 and 56) formed on the insulating layer 52, and cover 57 (indicated by a two-dot chain line in FIG. 4) that covers the conductors 55 and 56. The insulating layer 52 and cover 57 consist mainly of an electrically insulating material, such as polyimide. The illustration of the cover 57 is omitted in FIG. 5.

Respective one ends of the conductors 55 and 56 are connected to a write element (not shown) of the magnetic head 21. The respective other ends of the conductors 55 and 56 are connected to the amplifier through the terminal area 40c. These conductors 55 and 56 constitute a circuit member 60 for writing. The circuit member 60 is disposed along one side edge 50a of the metal base 50. A write signal received from the amplifier is applied to the magnetic head 21 through the conductors 55 and 56 that function as signal lines. A circuit member 61 (partially shown in FIG. 3) formed of a pair of read conductors is disposed along the other side edge 50b of the metal base 50.

The first and second conductors 55 and 56 are arranged substantially parallel to each other. An example of the conductors 55 and 56 consists mainly of copper plating film and is formed into a predetermined pattern along the insulating layer 52 by etching. The metal base 50 is thinner than the load beam 31. For example, the metal base 50 is 15 to 20 μm thick, while the load beam 31 is 30 to 62 μm thick. An example of the thickness of the conductors 55 and 56 is 15 μm; and of the cover 57, 5 μm. An example of the thickness of the insulating layer 52 is 10 μm.

In FIG. 4, arrow A indicates the thicknesswise direction of the metal base 50 and conductors 55 and 56. In FIG. 5, arrows B and C indicate the longitudinal and transverse directions, respectively, of the metal base 50 and conductors 55 and 56. As shown in FIGS. 3 to 5, a plurality of openings 70 are formed at regular intervals in a longitudinal part of the metal base 50 (or the first portion of the flexure 40). These openings 70 are arranged along the one side edge 50a of the metal base 50, that is, along the circuit member 60 for writing. In this specification, that longitudinal region of the metal base 50 which covers the openings 70 is referred to as the opening region S1, and the region free from the openings 70 as the non-opening region S2.

A plurality of openings 71 are formed in the other part of the metal base 50 so as to be arranged along the other edge 50b of the metal base, that is, along the circuit member 61 for reading. The openings 70 and 71 are formed by etching the metal base 50. The material of the metal base 50 is stainless steel, such as SUS304. The chemical composition (mass %) of SUS304 is 0.08 or less carbon, 1.00 or less silicon, 2.00 or less manganese, 8.00 to 10.50 nickel, 18.00 to 20.00 chromium, and iron for the remainder.

Figure 6:
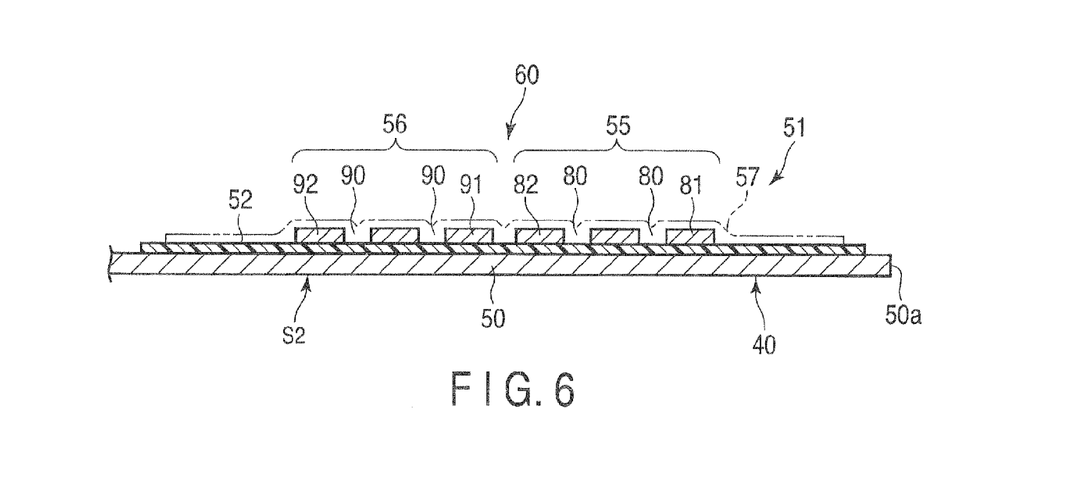
FIG. 6 is a cross-sectional view of a second portion of the flexure shown in FIG. 3.
Figure 7:
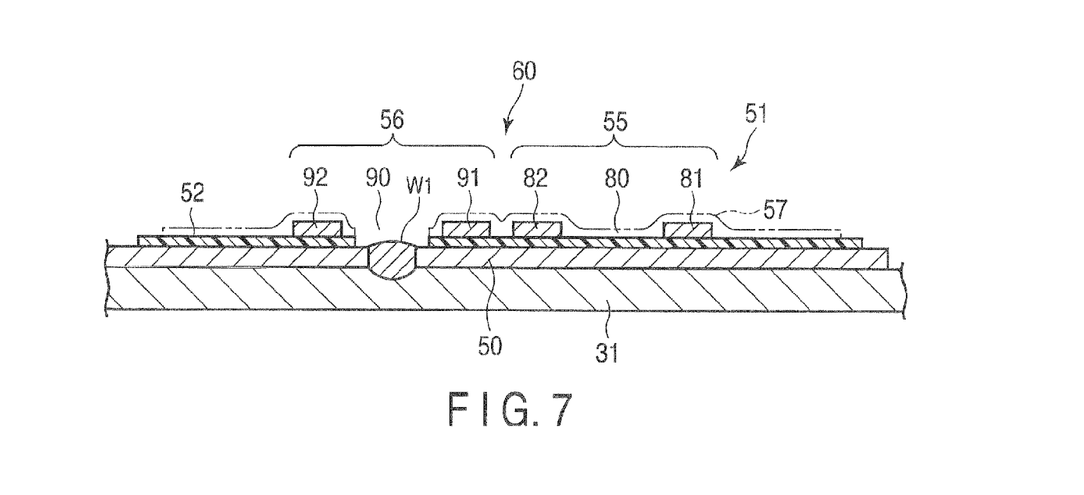
FIG. 7 is a cross-sectional view of a third portion of the flexure shown in FIG. 3.

As shown in FIG. 6, the non-opening region S2 free from the openings is formed in the other longitudinal part of the metal base 50 (or a second portion of the flexure 40). FIG. 7 shows a third portion of the flexure 40. A weld portion W1 for securing the metal base 50 and load beam 31 to each other is disposed in the third portion. The weld portion W1 is formed inside a slit 90 (described later) by, for example, laser spot welding. Since the slit 90 thus serves as a space for the weld portion W1, the design flexibility of the flexure 40 is increased.

The first conductor 55 comprises first slits 80, first band-like portions 81 and 82, and first junctions 83. The first slits 80 are formed extending longitudinally relative to the conductor 55. The first band-like portions 81 and 82 are located on the opposite sides of the first slits 80. The first junctions 83 electrically connect the first band-like portions 81 and 82. The band-like portions 81 and 82 extend longitudinally relative to the conductor 55 along the slits 80. The junctions 83 extend transversely relative to the conductor 55. The band-like portions 81 and 82 are electrically connected to each other by the junctions 83. The slits 80 and junctions 83, which are arranged in a plurality of positions longitudinally relative to the conductor 55, form a ladder-like structure, as shown in FIG. 5. The band-like portions 81 and 82 are continuous throughout the length of the conductor 55.

The second conductor 56 comprises second slits 90, second band-like portions 91 and 92, and second junctions 93. The second slits 90 are formed extending longitudinally relative to the conductor 56. The second band-like portions 91 and 92 are located on the opposite sides of the second slits 90. The second junctions 93 electrically connect the second band-like portions 91 and 92. The band-like portions 91 and 92 extend longitudinally relative to the conductor 56 along the slits 90. The junctions 93 extend transversely relative to the conductor 56. The band-like portions 91 and 92 are electrically connected to each other by the junctions 93. The slits 90 and junctions 93, which are arranged in a plurality of positions longitudinally relative to the conductor 56, form a ladder-like structure, as shown in FIG. 5. The band-like portions 91 and 92 are continuous throughout the length of the conductor 56. The conductors 55 and 56 are arranged covering both the opening and non-opening regions S1 and S2 of the metal base 50.

FIGS. 8 to 18 show conductor samples of Embodiments 1 to 11, respectively, which will be described in the following paragraphs. FIGS. 19 to 22 show conductor samples of Comparative Examples 1 to 4, respectively. These conductor samples have common dimensions, 1,000 µm long and 200 µm wide. Although only the first conductor 55 is shown in FIGS. 8 to 22, the second conductor 56 is constructed in the same manner as the first conductor 55.

Figure 8:
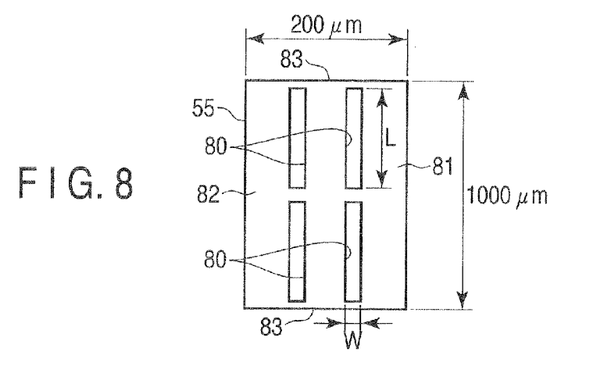
FIG. 8 is a plan view of a conductor sample of Embodiment 1.

FIG. 8 shows a conductor sample according to a first embodiment (Embodiment 1). In this conductor sample, two slits 80 are formed transversely relative to the conductor 55, and two longitudinally relative to the conductor 55. Slit length L and width W are 480 µm and 20 µm, respectively, and the aperture ratio (weight reduction ratio) of the slits is 19.2%. The impedance and frequency band (with attenuation of 3 dB) of this conductor sample (FIG. 8) disposed in the opening region S1 of a metal base 50 were 59Ω and 9.20 GHz, respectively. The impedance and frequency band (with attenuation of 3 dB) of this conductor sample disposed in the non-opening region S2 of the metal base 50 were 21Ω and 1.10 GHz, respectively.

Figure 9:
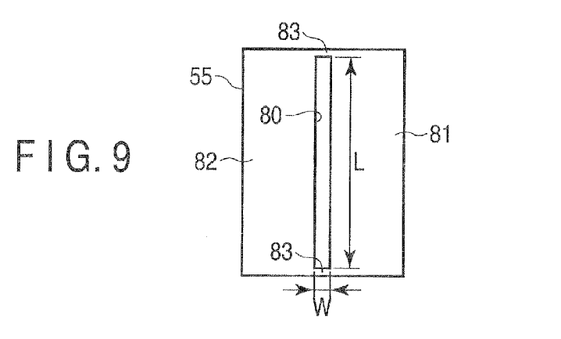
FIG. 9 is a plan view of a conductor sample of Embodiment 2.

FIG. 9 shows a conductor sample of a second embodiment (Embodiment 2). In this conductor sample, a single slit 80 is formed transversely relative to a conductor 55. Slit length L and width W are 960 µm and 20 µm, respectively, and the aperture ratio (weight reduction ratio) of the slit is 9.6%. The impedance and frequency band (with attenuation of 3 dB) of this conductor sample (FIG. 9) disposed in the opening region S1 of a metal base 50 were 58Ω and 9.15 GHz, respectively. The impedance and frequency band (with attenuation of 3 dB) of this conductor sample disposed in the non-opening region S2 of the metal base 50 were 21Ω and 1.10 GHz, respectively.

Figure 10:
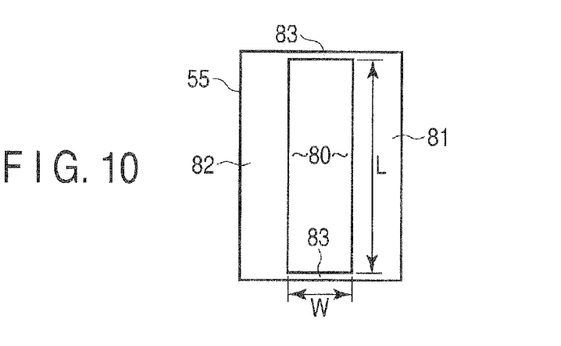
FIG. 10 is a plan view of a conductor sample of Embodiment 3.

FIG. 10 shows a conductor sample of a third embodiment (Embodiment 3). In this conductor sample, a single slit 80 is formed transversely relative to a conductor 55. Slit length L and width W are 960 µm and 100 µm, respectively, and the aperture ratio (weight reduction ratio) of the slit is 48.0%. The impedance and frequency band (with attenuation of 3 dB) of this conductor sample (FIG. 10) disposed in the opening region S1 of a metal base 50 were 61Ω and 8.95 GHz, respectively. The impedance and frequency band (with attenuation of 3 dB) of this conductor sample disposed in the non-opening region S2 of the metal base 50 were 27Ω and 1.35 GHz, respectively.

Figure 11:
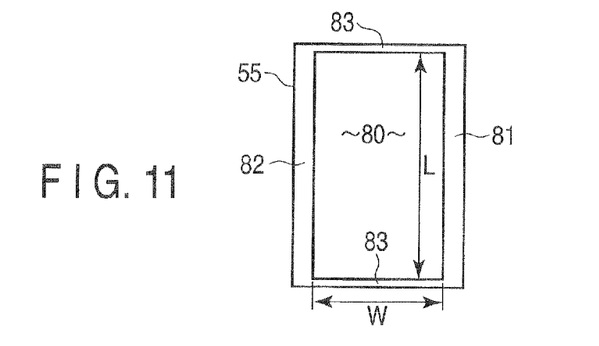
FIG. 11 is a plan view of a conductor sample of Embodiment 4.

FIG. 11 shows a conductor sample of a fourth embodiment (Embodiment 4). In this conductor sample, a single slit 80 is formed transversely relative to a conductor 55. Slit length L and width W are 960 µm and 160 µm, respectively, and the aperture ratio (weight reduction ratio) of the slit is 76.8%. The impedance and frequency band (with attenuation of 3 dB) of this conductor sample (FIG. 11) disposed in the opening region S1 of a metal base 50 were 68Ω and 8.00 GHz, respectively. The impedance and frequency band (with attenuation of 3 dB) of this conductor sample disposed in the non-opening region S2 of the metal base 50 were 40Ω and 1.85 GHz, respectively.

Figure 12:
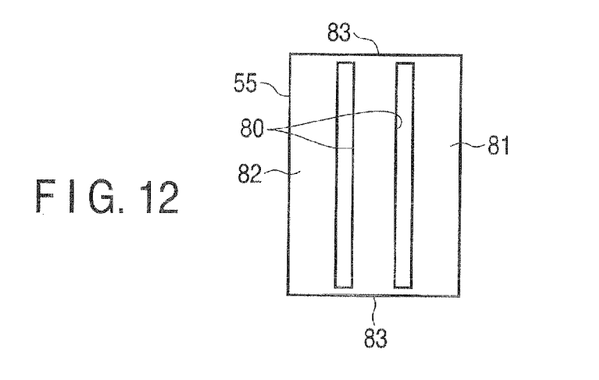
FIG. 12 is a plan view of a conductor sample of Embodiment 5.

FIG. 12 shows a conductor sample of a fifth embodiment (Embodiment 5). In this conductor sample, two slits 80 are formed transversely relative to a conductor 55. The slit length and width are 960 µm and 20 µm, respectively, and the aperture ratio (weight reduction ratio) of the slits is 19.2%. The impedance and frequency band (with attenuation of 3 dB) of this conductor sample (FIG. 12) disposed in the opening region S1 of a metal base 50 were 59Ω and 9.05 GHz, respectively. The impedance and frequency band (with attenuation of 3 dB) of this conductor sample disposed in the non-opening region S2 of the metal base 50 were 21Ω and 1.10 GHz, respectively.

Figure 13:
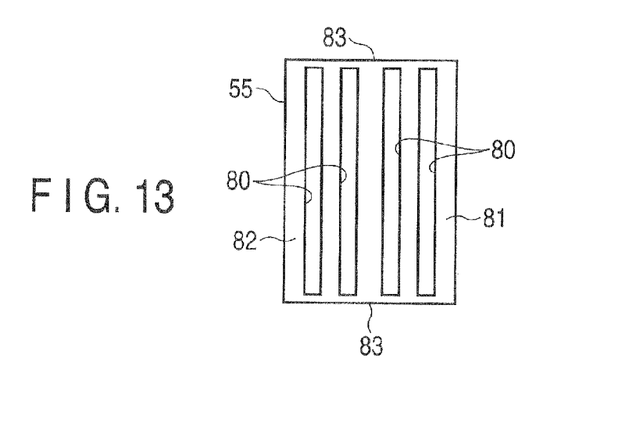
FIG. 13 is a plan view of a conductor sample of Embodiment 6.

FIG. 13 shows a conductor sample of a sixth embodiment (Embodiment 6). In this conductor sample, four slits 80 are formed transversely relative to a conductor 55. The slit length and width are 960 µm and 20 µm, respectively, and the aperture ratio (weight reduction ratio) of the slits is 38.4%. The impedance and frequency band (with attenuation of 3 dB) of this conductor sample (FIG. 13) disposed in the opening region S1 of a metal base 50 were 59Ω and 8.75 GHz, respectively. The impedance and frequency band (with attenuation of 3 dB) of this conductor sample disposed in the non-opening region S2 of the metal base 50 were 21Ω and 1.15 GHz, respectively.

Figure 14:
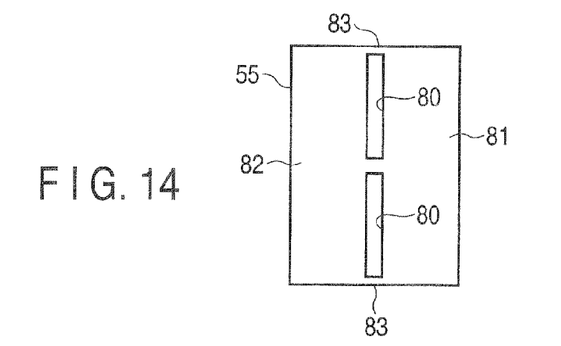
FIG. 14 is a plan view of a conductor sample of Embodiment 7.

FIG. 14 shows a conductor sample of a seventh embodiment (Embodiment 7). In this conductor sample, a single slit 80 is formed transversely relative to a conductor 55, and two longitudinally relative to the conductor 55. The length and width are 480 μm and 20 μm, respectively, and the aperture ratio (weight reduction ratio) of the slits is 9.6%. The impedance and frequency band (with attenuation of 3 dB) of this conductor sample (FIG. 14) disposed in the opening region S1 of a metal base 50 were 59Ω and 9.25 GHz, respectively.

Figure 15:
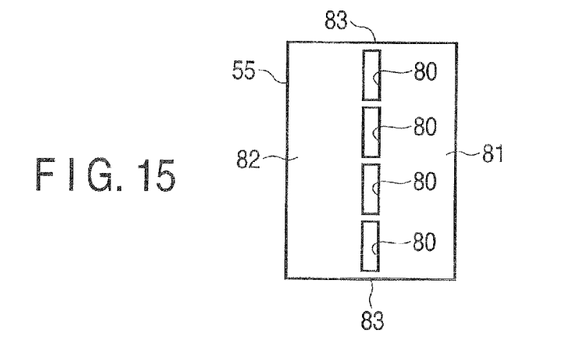
FIG. 15 is a plan view of a conductor sample of Embodiment 8.

FIG. 15 shows a conductor sample of an eighth embodiment (Embodiment 8). In this conductor sample, a single slit 80 is formed transversely relative to a conductor 55, and four longitudinally relative to the conductor 55. The slit length and width are 230 μm and 20 μm, respectively, and the aperture ratio (weight reduction ratio) of the slits is 9.2%. The impedance and frequency band (with attenuation of 3 dB) of this conductor sample (FIG. 15) disposed in the opening region S1 of a metal base 50 were 58Ω and 9.10 GHz, respectively.

Figure 16:
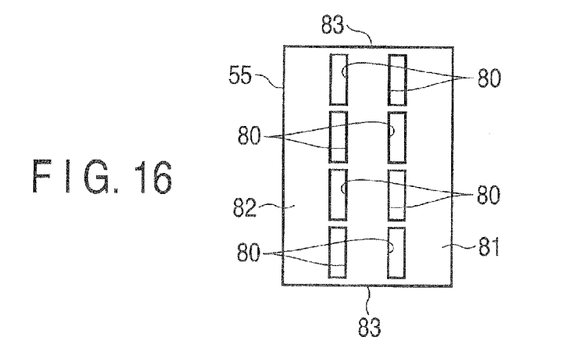
FIG. 16 is a plan view of a conductor sample of Embodiment 9.

FIG. 16 shows a conductor sample of a ninth embodiment (Embodiment 9). In this conductor sample, two slits 80 are formed transversely relative to a conductor 55, and four longitudinally relative to the conductor 55. The slit length and width are 230 μm and 20 μm, respectively, and the aperture ratio (weight reduction ratio) of the slits is 18.4%. The impedance and frequency band (with attenuation of 3 dB) of this conductor sample (FIG. 16) disposed in the opening region S1 of a metal base 50 were 59Ω and 9.15 GHz, respectively.

Figure 17:
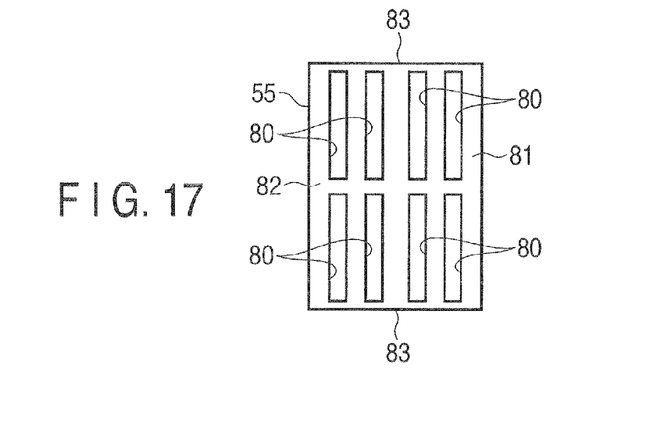
FIG. 17 is a plan view of a conductor sample of Embodiment 10.

FIG. 17 shows a conductor sample of a tenth embodiment (Embodiment 10). In this conductor sample, four slits 80 are formed transversely relative to a conductor 55, and two longitudinally relative to the conductor 55. The slit length and width are 480 μm and 20 μm, respectively, and the aperture ratio (weight reduction ratio) of the slits is 38.4%. The impedance and frequency band (with attenuation of 3 dB) of this conductor sample (FIG. 17) disposed in the opening region S1 of a metal base 50 were 59Ω and 8.85 GHz, respectively.

Figure 18:
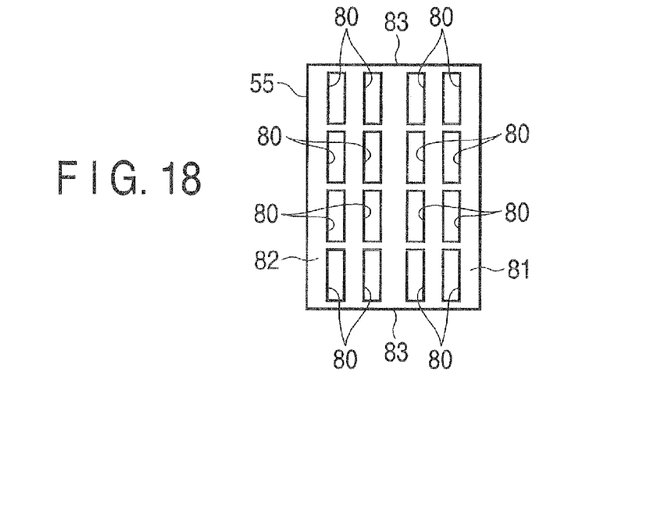
FIG. 18 is a plan view of a conductor sample of Embodiment 11.

FIG. 18 shows a conductor sample of an eleventh embodiment (Embodiment 11). In this conductor sample, four slits 80 are formed transversely relative to a conductor 55, and four longitudinally relative to the conductor 55. The slit length and width are 230 μm and 20 μm, respectively, and the aperture ratio (weight reduction ratio) of the slits is 36.8%. The impedance and frequency band (with attenuation of 3 dB) of this conductor sample (FIG. 18) disposed in the opening region S1 of a metal base 50 were 59Ω and 8.90 GHz, respectively.

Figure 19:
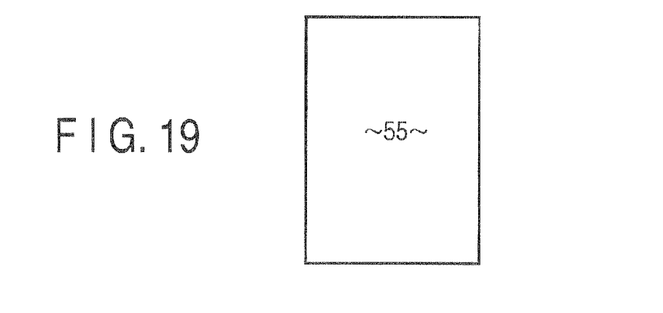
FIG. 19 is a plan view of a conductor sample of Comparative Example 1.

FIG. 19 shows a conductor sample of Comparative Example 1. Since this conductor sample is not formed with any slit, the aperture ratio (weight reduction ratio) of slits to a conductor is zero, so that no weight reduction can be achieved. The impedance and frequency band (with attenuation of 3 dB) of the conductor sample of Comparative Example 1 disposed in the opening region S1 of a metal base 50 were 59Ω and 9.25 GHz, respectively. The impedance and frequency band (with attenuation of 3 dB) of the conductor sample of Comparative Example 1 disposed in the non-opening region S2 of the metal base 50 were 19Ω and 1.00 GHz, respectively.

Figure 20:
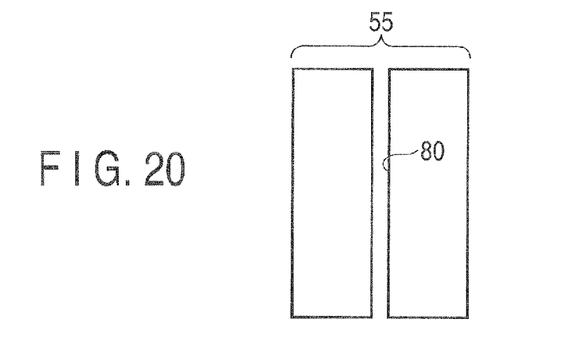
FIG. 20 is a plan view of a conductor sample of Comparative Example 2.

FIG. 20 shows a conductor sample of Comparative Example 2. In this conductor sample, a single slit 80 is formed transversely relative to a conductor 55 and is open at both ends. Comparative Example 2 does not comprise portions equivalent to the junctions 83 of Embodiments 1 to 11. In Comparative Example 2, the slit length and width are 1,000 μm and 20 μm, respectively, and the aperture ratio (weight reduction ratio) of the slit is 10.0%. The impedance and frequency band (with attenuation of 3 dB) of the conductor sample of Comparative Example 2 disposed in the opening region S1 of a metal base 50 were 59Ω and 7.75 GHz, respectively.

Figure 21:
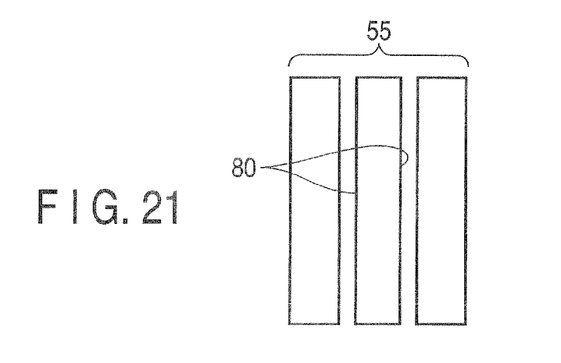
FIG. 21 is a plan view of a conductor sample of Comparative Example 3.

FIG. 21 shows a conductor sample of Comparative Example 3. In this conductor sample, two slits 80 are formed transversely relative to a conductor 55 and are open at both ends. Comparative Example 3 does not comprise portions equivalent to the junctions 83 of Embodiments 1 to 11 either. In Comparative Example 3, the slit length and width are 1,000 μm and 20 μm, respectively, and the aperture ratio (weight reduction ratio) of the slits is 20.0%. The impedance and frequency band (with attenuation of 3 dB) of the conductor sample of Comparative Example 3 disposed in the opening region S1 of a metal base 50 were 59Ω and 7.25 GHz, respectively.

Figure 22:
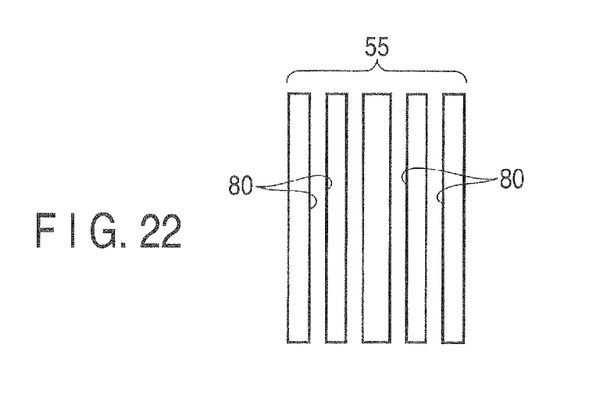
FIG. 22 is a plan view of a conductor sample of Comparative Example 4.

FIG. 22 shows a conductor sample of Comparative Example 4. In this conductor sample, four slits 80 are formed transversely relative to a conductor 55 and are open at both ends. Comparative Example 4 does not comprise portions equivalent to the junctions 83 of Embodiments 1 to 11 either. In Comparative Example 4, the slit length and width are 1,000 μm and 20 μm, respectively, and the aperture ratio (weight reduction ratio) of the slits is 40.0%. The impedance of the conductor sample of Comparative Example 4 disposed in the opening region S1 of a metal base 50 was 59Ω. The frequency band (with attenuation of 3 dB) of this conductor sample was not able to be measured.

Table 1 shows the impedances and frequency bands (with attenuation of 3 dB) of the conductor samples of Embodiments 1 to 11 and Comparative Examples 1 to 4 disposed in the opening region S1 of each metal base 50.

TABLE 1

| | Combination of conductor and metal base (opening region) | | | | |
|---|---|---|---|---|---|
| Sample name | Slit length (μm) | Slit width (μm) | Aperture ratio (%) | Impedance (Ω) | Frequency band (GHz) |
| Embodiment 1 | 480 | 20 | 19.2 | 59 | 9.20 |
| Embodiment 2 | 960 | 20 | 9.6 | 58 | 9.15 |
| Embodiment 3 | 960 | 100 | 48.0 | 61 | 8.95 |
| Embodiment 4 | 960 | 160 | 76.8 | 68 | 8.00 |
| Embodiment 5 | 960 | 20 | 19.2 | 59 | 9.05 |
| Embodiment 6 | 960 | 20 | 38.4 | 59 | 8.75 |
| Embodiment 7 | 480 | 20 | 9.6 | 59 | 9.25 |
| Embodiment 8 | 230 | 20 | 9.2 | 58 | 9.10 |
| Embodiment 9 | 230 | 20 | 18.4 | 59 | 9.15 |
| Embodiment 10 | 480 | 20 | 38.4 | 59 | 8.85 |
| Embodiment 11 | 230 | 20 | 36.8 | 59 | 8.90 |
| Comparative Example 1 | — | — | — | 59 | 9.25 |
| Comparative Example 2 | 1000 | 20 | 10.0 | 59 | 7.75 |
| Comparative Example 3 | 1000 | 20 | 20.0 | 59 | 7.25 |
| Comparative Example 4 | 1000 | 20 | 40.0 | 59 | — |

As shown in Table 1, the conductor samples of Embodiments 1 to 11 can be made 9% or more lighter than the conductor without a slit (Comparative Example 1), their impedance is equal to that of Comparative Example 1, and their frequency band is 8.0 GHz or more. Thus, Embodiments 1 to 11 can reconcile a weight reduction with a good electrical property (high-frequency band).

In Comparative Example 1, the slit aperture ratio is zero, so that no weight reduction can be achieved. Comparative Examples 2 to 4 can achieve a weight reduction of 10% or more. Since each slit 80 is open at both ends, however, the frequency band is made narrower by reflection that occurs at the ends of the conductor, so that it is limited to less than 8.0 GHz. In order to widen or increase the frequency band, the conductors 55 and 56 comprising the slits 80 such as those of Embodiments 1 to 11 should be provided with the junctions 83 and 93 at least at both ends of the slits 80.

Table 2 shows the impedances and frequency bands (with attenuation of 3 dB) of the conductor samples of Embodiments 1 to 6 and Comparative Example 1 disposed in the non-opening region S2 of each metal base 50.

TABLE 2

Combination of conductor and metal base (non-opening region)

| Sample name | Slit length (μm) | Slit width (μm) | Aperture ratio (%) | Impedance (Ω) | Frequency band (GHz) |
|---|---|---|---|---|---|
| Embodiment 1 | 480 | 20 | 19.2 | 21 | 1.10 |
| Embodiment 2 | 960 | 20 | 9.6 | 21 | 1.10 |
| Embodiment 3 | 960 | 100 | 48.0 | 27 | 1.35 |
| Embodiment 4 | 960 | 160 | 76.8 | 40 | 1.85 |
| Embodiment 5 | 960 | 20 | 19.2 | 21 | 1.10 |
| Embodiment 6 | 960 | 20 | 38.4 | 21 | 1.15 |
| Comparative Example 1 | — | — | — | 19 | 1.00 |

In the case where the conductor is disposed in the non-opening region S2 of the metal base 50, as shown in Table 2, the impedance can be made lower than in the case (Table 1) where the conductor is disposed in the opening region S1 of the metal base 50. The higher the aperture ratio of the slits 80, moreover, the wider the frequency band can be made. These characteristics can be displayed by arranging the conductor of the present invention so as to cover both the opening and non-opening regions S1 and S2 of the metal base 50. By means of this arrangement, the impedance and frequency characteristics of the conductive circuit portion of the flexure can be matched with the amplifier and magnetic head.

It is to be understood, in carrying out the present invention, that the constituent elements of the invention, such as the shapes of the openings in the metal base, slits in the conductor, band-like portions, junctions, etc., as well as the configuration of the suspension, may be embodied in various forms. Depending on the required electrical properties of the conductive circuit portion of the flexure, moreover, the slits, band-like portions, and junctions may be formed on one of the pair of conductors that constitute the circuit member.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive flexure secured to a load beam of a disk drive suspension and comprising a gimbal portion, the disk drive flexure comprising:
a plate-like metal base consisting mainly of an electrically conductive material and formed, in a longitudinal part thereof, with an opening region, which comprises an opening, and a non-opening region without an opening;
an insulating layer consisting mainly of an electrically insulating material and formed on the metal base; and
a pair of conductors arranged longitudinally relative to the metal base on the insulating layer and electrically connected to a magnetic head,
at least one of the conductors comprising a slit extending longitudinally relative to the conductor, band-like portions extending along the slit on the opposite sides thereof, and a junction electrically connecting the band-like portions,
the conductor which comprises the slit being located covering both the opening region and the non-opening region of the metal base.

2. The disk drive flexure of claim 1, wherein a plurality of the slits are formed transversely relative to the conductor.

3. The disk drive flexure of claim 2, wherein a plurality of the slits are formed longitudinally relative to the conductor.

4. The disk drive flexure of claim 3, wherein each of the conductors is formed with the slit, the band-like portions, and the junction.

5. The disk drive flexure of claim 2, wherein each of the conductors is formed with the slit, the band-like portions, and the junction.

6. The disk drive flexure of claim 1, wherein a plurality of the slits are formed longitudinally relative to the conductor.

7. The disk drive flexure of claim 6, wherein each of the conductors is formed with the slit, the band-like portions, and the junction.

8. The disk drive flexure of claim 1, wherein each of the conductors is formed with the slit, the band-like portions, and the junction.

9. The disk drive flexure of claim 1, wherein a weld portion configured to secure the metal base and the load beam to each other is disposed within the slit.

* * * * *